(12) United States Patent
Dill

(10) Patent No.: US 10,870,344 B2
(45) Date of Patent: Dec. 22, 2020

(54) AIR FLAP APPARATUS HAVING INTEGRATED LIGHT GUIDES, FOR A MOTOR VEHICLE

(71) Applicant: Röchling Automotive SE & Co. KG, Mannheim (DE)

(72) Inventor: Peter Dill, Ingolstadt (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 5 days.

(21) Appl. No.: 16/510,085

(22) Filed: Jul. 12, 2019

(65) Prior Publication Data
US 2020/0023728 A1    Jan. 23, 2020

(30) Foreign Application Priority Data

Jul. 18, 2018   (DE) .......................... 10 2018 211 996

(51) Int. Cl.
*B60K 11/08*     (2006.01)
*B60Q 1/26*     (2006.01)
(Continued)

(52) U.S. Cl.
CPC .......... *B60K 11/085* (2013.01); *B60Q 1/2661* (2013.01); *B60Q 1/50* (2013.01); *F01P 7/10* (2013.01); *B60L 2240/36* (2013.01)

(58) Field of Classification Search
CPC ............................................. B60K 11/08–085
See application file for complete search history.

(56) References Cited

U.S. PATENT DOCUMENTS

| 8,161,919 B2 * | 4/2012 | Klotz .................. B60K 11/085 123/41.04 |
| 8,720,624 B2 * | 5/2014 | Remy .................. B60K 11/085 180/68.1 |

(Continued)

FOREIGN PATENT DOCUMENTS

GB         2515642 A  * 12/2014 ............. B60K 11/08

OTHER PUBLICATIONS

Espacenet Bibliographic data: DE 102008013422 (A1), Published Sep. 17, 2009, 1pg.
(Continued)

*Primary Examiner* — Erez Gurari
(74) *Attorney, Agent, or Firm* — Rankin, Hill & Clark LLP

(57) ABSTRACT

An air flap apparatus for a motor vehicle, encompassing a frame having a flowthrough opening, at least one air flap mounted movably relative to the frame that projects into the flowthrough opening; the at least one air flap being displaceable between closed and open positions in order to modify a gas quantity flowing per unit time, with a predefined flow impingement, through the flowthrough opening; the at least one air flap decreasing a flowthrough-capable cross section of the flowthrough opening greater in the closed position than in the open position; the air flap apparatus further encompassing a motion drive system that is coupled to the at least one air flap to drive the at least one air flap between the closed and open positions, at least one air flap, constituting a light-emitting air flap, having at least one light exit surface to radiate light to an external environment of the light-emitting air flap, the light-emitting air flap having at least one light-guiding light guidance component to guide light from a light entrance portion through to a light exit portion arranged at a distance therefrom, the light guidance (Continued)

component being embodied integrally with a structural component of the light-emitting air flap.

20 Claims, 3 Drawing Sheets

(51) Int. Cl.
*B60Q 1/50* (2006.01)
*F01P 7/10* (2006.01)

(56) References Cited

U.S. PATENT DOCUMENTS

| | | | |
|---|---|---|---|
| 8,833,498 B2* | 9/2014 | Charnesky | F01P 11/20 |
| | | | 180/68.1 |
| 9,365,106 B2* | 6/2016 | Bruckner | B60K 11/02 |
| 2013/0001454 A1* | 1/2013 | Schwarz | B60K 11/085 |
| | | | 251/304 |
| 2016/0363035 A1 | 12/2016 | Solazzo | |
| 2017/0144710 A1* | 5/2017 | Frayer | H01Q 1/3233 |
| 2017/0248066 A1* | 8/2017 | Wolf | F01P 7/10 |
| 2017/0326967 A1* | 11/2017 | Brueckner | B60K 11/04 |

OTHER PUBLICATIONS

German Search Report for corresponding DE 10 2018 211 996.1 dated Jul. 10, 2019, 8 pgs.
Espacenet Bibliographic data:DE 102009039038 (A1), Published Mar. 3, 2011, 1pg.
Espacenet Bibliographic data:EP 3144182 (A1), Published Mar. 22, 2017, 1pg.

* cited by examiner

AIR FLAP APPARATUS HAVING INTEGRATED LIGHT GUIDES, FOR A MOTOR VEHICLE

The present invention relates to an air flap apparatus for a motor vehicle. The air flap apparatus encompasses a frame having a flowthrough opening, on which frame at least one air flap is mounted movably relative to the frame, when considered in an operational flow impingement direction, so as to project into or pass through the flowthrough opening; the at least one air flap being displaceable between a closed position and an open position in order to modify a gas quantity flowing per unit time, with a predefined flow impingement, through the flowthrough opening; the at least one air flap decreasing a flowthrough-capable cross section of the flowthrough opening more greatly in the closed position than in the open position; the air flap apparatus further encompassing a motion drive system that is motion- and force-transferringly coupled to the at least one air flap in order to drive the at least one air flap to move between the closed position and the open position.

BACKGROUND OF THE INVENTION

An air flap apparatus of this species is known, for example, from DE 10 2015 210 683 A1 or also from DE 10 2008 013 422 A1. Air flap apparatuses of the kind recited previously serve on a motor vehicle, as a rule, to make the flowthrough opening flowthrough-capable for a flow of convective cooling air, or to block it for such a flow, by corresponding displacement of the at least one air flap between the open position and closed position.

Such air flap apparatuses are usually arranged at the front of a motor vehicle, where they are impinged upon by wind blast as the vehicle carrying the air flap apparatus travels forward. The wind blast can then constitute the aforesaid convective cooling air, whose flow through the flowthrough opening can impinge upon accessories located behind the flowthrough opening in a flowthrough direction in order to cool them. For example, a heat exchanger for an operating liquid of the motor vehicle, for instance for a cooling liquid or for a lubricant, can be arranged behind the flowthrough opening in a flowthrough direction and behind the at least one air flap.

It is likewise possible for there to be arranged in the vicinity of the flowthrough opening, usually behind the flowthrough opening and behind the air flap in a flowthrough direction, a fan that, when the travel speed of the vehicle carrying the air flap apparatus is not sufficient for adequate convective cooling, takes in air through the flowthrough opening when the flowthrough opening is open, and delivers it in turn to the accessories that are to be convectively cooled, in particular moves it through the heat exchanger.

Air flap apparatuses of this kind, in particular for arrangement at the front of a motor vehicle, are commonly known by way of the documents recited above as examples.

SUMMARY OF THE INVENTION

An object of the present invention is to refine the air flap apparatus recited previously in such a way that in a context of maximally simple and precise manufacture of the air flap apparatus, the operating position in which it is located is recognizable, even in darkness, from outside the vehicle carrying the air flap apparatus.

This object is achieved according to the present invention by an air flap apparatus of the kind recited previously in which at least one air flap of the air flap apparatus, constituting a light-emitting air flap, comprises at least one light exit surface that is embodied to radiate light to an external environment of the light-emitting air flap, the light-emitting air flap comprising at least one light-guiding light guidance component that is embodied to guide light from a light entrance portion through to a light exit portion arranged at a distance therefrom, the light guidance component being embodied integrally with a structural component of the light-emitting air flap.

This is because when light can emerge or radiate through the flap light guide of the light-emitting air flap to the external environment of the light-emitting air flap, the light is perceptible from outside the air flap apparatus. Because the flap light guide is provided on the light-emitting air flap, it is displaced together with the light-emitting air flap between its operating positions (closed position and open position), the light emerging through the light exit surface being perceived by the observer, given a substantially constant observer position, differently in different operating positions of the light-emitting air flap. The respective position of the light-emitting air flap can thus be recognized even in the complete absence of external light sources.

Thanks to the integral embodiment of the light guidance component and structural component of the light-emitting air flap, the light guidance component and the structural component can be manufactured using one shared manufacturing method and optimally arranged relative to one another. Required gap dimensions between different light-guiding components can thereby be adhered to without a great deal of installation complexity. This is because, as a result of the integral embodiment of the structural component and light guidance component, these two components can already be connected to one another upon manufacture thereof, and can be secured in an optimum spatial placement relationship relative to one another. With the arrangement of the structural component, embodied integrally with the light guidance component, of the light-emitting air flap on at least one further structural component of the light-emitting air flap for manufacture thereof, the light-emitting component then becomes arranged, without further particular actions, in an exact installation and operating position relative to the at least one further structural component. As a result of installation of the structural components of a light-emitting air flap, the light-guiding components involved in the light-emitting air flap are thus readily arranged in their correct positions and do not need to be readjusted.

"Light guides" for purposes of the present Application are components that are transparent at least in a light-guidance direction and are capable, as a result of their physical conformation, of guiding light in a light-guidance direction, since because of the refractive indices of materials used in the light guide, light propagating in the light guide becomes reflected back into the light guide at the interface of the light guide and can thus leave the light guide predominantly, preferably only, through the light exit surface. The light yield at the light exit is thus very high, which makes it possible to use lower-output light sources to feed light into the flap light guide.

A "structural component" for purposes of the present Application, conversely, as a rule is not embodied for the guidance of light but rather is opaque. A structural component for purposes of the present Application serves functionally, if applicable after assembly with at least one further structural component, to constitute the air flap in terms of its aerodynamic property, namely to modify, as a function of its operating position relative to the frame of the air flap apparatus, the cross section of the flowthrough opening through which air can flow.

In principle, there exist several possibilities for embodying the at least one structural component and the at least one light guidance component integrally with one another. For example, the structural component can be manufactured by primary forming. It can, for example, be molded onto the light guidance component. Conversely, the light guidance component can also be manufactured by primary forming and molded onto the structural component.

Preferably, at least one component from among the structural component and light guidance component is manufactured with a high degree of geometrical accuracy by injection molding so that, also preferably, one component from among the structural component and light guidance component can be molded by injection molding onto the respective other component for integral constitution of the at least one structural component and of the at least one light guidance component. The one component from among the structural component and light guidance component is "molded onto" the respective other component when an interface, generated by injection molding, of the one component contacts the respective other component in planar fashion.

A particularly secure physical connection between the light guidance component and the structural component can be obtained by the fact that a portion of the light guidance component is overmolded by the structural component. The portion of the light guidance component is "overmolded" by the structural component when an interface of the structural component which contacts the light guidance component surrounds the portion of the light guidance component in such a way that the portion of the light guidance component is arranged between regions of the interface which are arranged at a distance from one another, and whose normal vector respectively comprises a vector component that points toward the respective other region of the interface. Preferably the aforesaid regions of the interface are located opposite one another with formation of a spacing distance, the spacing distance being at least partly filled by the light guidance component. The statement that a portion of the light guidance component is "overmolded" by the structural component says nothing about which of the two components (light guidance component and structural component) was manufactured first, although it is preferred that the already-manufactured light guidance component be overmolded, upon manufacture of the structural component, with the injection-molding compound used to manufacture the structural component.

It is conceivable in principle firstly to manufacture the one component from among the structural component and light guidance component in a separate mold, and then to insert it as an insert into the injection-molding cavity for manufacture of the respective other component, so as thereby, with manufacture of the other component, to mold it onto the one component or to overmold the one component with the other. The light guidance component can likewise be manufactured by injection molding, from at least one transparent thermoplastic.

According to a particularly preferred refinement of the present invention, the structural component and the light guidance component can thus be manufactured using the multi-component injection molding method. Using sliders and/or further movable parts of a shared mold cavity of the structural component and light guidance component, firstly one of the two components can be injection-molded in the mold cavity, and then the respective other component can be injection-molded in the mold cavity along with the one component that has already been injection-molded.

The at least one light-emitting air flap is preferably an elongated air flap that has its greatest dimension along a flap axis. It is preferably pivotable, around a pivot axis that is parallel to the flap axis, between its open position and closed position.

The at least one light-emitting air flap can comprise only one light guidance component or, preferably, several light guidance components. The at least one light-emitting air flap likewise can comprise only one structural component or can comprise several structural components.

To allow light to be emitted from the light-emitting air flap to its external environment over a longitudinal portion thereof that is as large as possible, the at least one light guidance component can comprise a flap light guide having a light entrance surface and a light exit surface. The structural component encompasses or is preferably a portion of a flap body, arranged as intended in the flowthrough opening, of the light-emitting air flap, at a point where the structural component is readily visible from outside and the light radiated from the light-emitting air flap is thus readily perceptible. In the interest of a light output from the light-emitting air flap which is perceptible from as far away as possible even at a great distance, the flap light guide preferably extends over at least half, preferably at least two thirds, particularly preferably three quarters, of the length of the flap body.

The "flap body" here is that part of the air flap which interacts with the air flow impinging upon the air flap apparatus in order to modify the quantity of air passing through the flowthrough opening per unit time. The light-emitting air flap, like another air flap, can comprise, for example in addition to the flap body, bearing configurations, such as bearing stems, which mount the air flap with the desired movability on the frame.

For simple, secure, and highly precise arrangement of the flap light guide in the flap body, the flap body can comprise a receiving recess for receiving the flap light guide therein, such that the structural component, which constitutes a portion of the flap body and is constituted integrally with the flap light guide, is a cover that covers the receiving recess. With arrangement of the structural components in the form of the cover on the remainder of the flap body, thus not only can the flap light guide be arranged precisely in the receiving recess, provided for it, of the flap body, but furthermore the receiving recess can be closed off by the cover, in particular closed off sealingly, for example by adhesively bonding or welding the cover to the remainder of the flap.

For simple perception of the light emitted from it, the at least one light-emitting air flap can comprise, on its front side that is impinged upon by flow during operation as intended, an emission opening through which light can be emitted from the flap light guide to the external environment of the light-emitting flap.

This emission opening can be part of the receiving recess, which can pass completely through the flap body in the latter's thickness direction. In this case the aforementioned cover forms a closure of the receiving recess on one side of the flap body, preferably on its rear side that is opposite from the front side impinged upon by flow during operation.

For maximally uniform distribution of light that is emitted from the light exit surface of the flap light guide, the at least one light guidance component preferably comprises an optical diffusor apparatus that is arranged in the emission opening and has a light input surface and a light output surface. The diffusor apparatus is also a light guidance component for purposes of the present Application. The structural component is then in turn preferably a portion of a flap body, arranged as intended in the flowthrough opening, of the light-emitting air flap. For optimum transfer of light from the flap light guide to the diffusor apparatus, preferably the light input surface of the optical diffusor apparatus is arranged oppositely and at a distance from the light exit surface of the flap light guide. The gap thus constituted between the light input surface of the diffusor apparatus and the light exit surface of the flap light guide can be filled with air or with another gas, or can be under a partial vacuum.

The integral embodiment of the flap light guide with its structural component as a first part of the flap body, and of the diffusor apparatus with its structural component as a second part of the flap body, results, without further actions, in an optimum spacing dimension between the light exit surface and light input surface upon assembly of the structural components of the flap light guide and diffusor apparatus. At least one of those surfaces, preferably both surfaces, can therefore be embodied to be smooth, i.e. to have no protrusions and depressions in the respective surface.

When the emission opening is part of a receiving recess that passes through the flap body in its thickness direction, the cover along with the flap light guide closes off the receiving recess on one side of the flap body, preferably on its rear side, and the diffusor apparatus on the opposite side, preferably on the front side of the flap body. Care is to be taken, however, that only the cover for closing off the receiving recess is to be arranged on the remainder of the flap body, while the diffusor apparatus is already, as a result of the above-described preferred overmolding or molding-on in the context of multi-component injection molding, arranged in captive and fluid-tight fashion in the structural component that carries it.

Because the diffusor apparatus in essence spatially equalizes the propagation of light that is emitted from the light exit surface of the flap light guide, the diffusor apparatus also preferably extends over at least half, by preference at least two thirds, particularly preferably at least three quarters, of the length of the flap body. As a rule the diffusor apparatus will have a longitudinal dimension that is on the order of the longitudinal dimension of the light exit surface. According to a preferred embodiment, the length of the diffusor apparatus is equal to between 80% and 120% of the length of the light exit surface of the flap light guide, so that the diffusor apparatus can scatter to the external environment of the light-emitting air flap, i.e. equalize, substantially all the light emerging from the light exit surface of the flap light guide.

In principle, the light entrance surface of the flap light guide can provide incoupling of the light of a light source, preferably on the frame. This can, however, complicate installation of the flap light guide on the flap body or on the light-emitting air flap, since the receiving recess in which the flap light guide is received on the operationally ready light-emitting light flap should be sealed as hermetically as possible with respect to the external environment so that the transmission of light through the light-emitting air flap can function with as little disruption as possible for a long time.

Optimum sealing of the receiving recess with respect to the external environment can be furnished by the fact that the at least one light guidance component comprises an incoupling light guide having a light incoupling surface and a light outcoupling surface; and that the structural component is a portion of a flap body, arranged as intended in the flowthrough opening, of the light-emitting air flap, the light outcoupling surface of the incoupling light guide being arranged oppositely and at a distance from the light entrance surface of the flap light guide.

The incoupling light guide is also a light guidance component as defined above. Its light outcoupling surface faces into the receiving recess, where the light entrance surface of the flap light guide lies opposite it. Because the incoupling light guide is embodied integrally with a structural component of the light-emitting air flap, in particular of the flap body or also of a bearing configuration, light can travel into the receiving recess of the light-emitting air flap, in particular of the flap body, with no need to accept for that purpose even a small gap between the incoupling light guide and the structure that carries it. The same is also true, moreover, of the diffusor apparatus and the structural component manufactured integrally therewith. Furthermore, the same is true of the flap light guide and its integral structural component, in particular the aforesaid cover. Light can therefore be emitted into the receiving recess via the incoupling light guide and emitted from it, scattered by the diffusor apparatus, to the external environment. Between them, the light scattered via the incoupling light guide into the receiving recess is directed via the flap light guide, over the latter's longitudinal extent, from the incoupling light guide to the diffusor apparatus, and preferably distributed over a longitudinal region of the light-emitting air flap. Gas and dirt do not get into the receiving recess.

In order to simplify installation of the light-emitting air flap, provision is preferably made that the structural component that carries the incoupling light guide and constitutes a one-piece structural component is also the structural component that carries the optical diffusor apparatus. Preferably the incoupling light guide, the diffusor apparatus, and the one-piece structural component that carries them are manufactured, as already stated above, using the multi-component injection-molding method.

The light entrance surface of the flap light guide, the light input surface of the diffusor apparatus, and the light incoupling surface of the incoupling light guide each constitute a concrete embodiment of the light entrance portion recited in general above. The light exit surface of the flap light guide, the light output surface of the diffusor apparatus, and the light outcoupling surface of the incoupling light guide likewise each constitute a concrete embodiment of the light exit portion recited in general above.

Although the air flap apparatus can comprise only a single light-emitting air flap, it preferably comprises a plurality of light-emitting air flaps in order to control the largest possible quantity of air per unit time. In order to furnish a flow-through opening that is large as possible, these are preferably arranged on the frame successively along a succession axis. The succession axis proceeds as a rule orthogonally to the above-described flap axis or pivot axis of the respective light-emitting air flaps.

For improved flow guidance of the air flow through the flowthrough opening, the air flap apparatus can additionally comprise a plurality of flow-directing surfaces that are mounted on the frame immovably relative thereto and project into or pass through the flowthrough opening. The flow-directing surfaces, constituting light-emitting flow-directing surfaces, can also, similarly to the light-emitting air flaps, be equipped with at least one light guidance component that emits light to the external environment through an exit opening of the light-emitting flow-guidance surfaces. The statements made above regarding the light-emitting air flap apply correspondingly, with regard to its physical construction, to such a light-emitting flow-directing surface.

The difference between a light-emitting air flap and a light-emitting flow-directing surface has to do not with their light-guiding and light-delivering properties, but merely with their relative movability with respect to the frame, said movability existing for the light-emitting air flap and not existing for the light-emitting flow-directing surface.

In order to supply the at least one light-emitting air flap and, if applicable, also the light-emitting flow-directing surfaces, a frame light guide, which is light-transferringly coupled to at least one light guidance component of the at least one light-emitting air flap, if applicable also of the light-emitting flow-directing surfaces, can be retained on the frame. The air flap apparatus can furthermore comprise a light source, for example an LED, which is light-transferringly connected to the frame light guide in such a way that light emitted from the light source is transferrable by the frame light guide. The frame light guide is embodied to transfer light, by way of corresponding coupling points, to the at least one light incoupling surface of an incoupling light guide of a light-emitting air flap. Portions of the frame light guide can be movable together with the light-emitting air flaps.

The present invention furthermore relates to a motor vehicle having an air flap apparatus according to one of the preceding claims, such that a front side of the at least one light-emitting air flap, which is impinged upon in the closed position by wind blast when the motor vehicle is traveling forward, faces in a forward travel position in the closed position.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
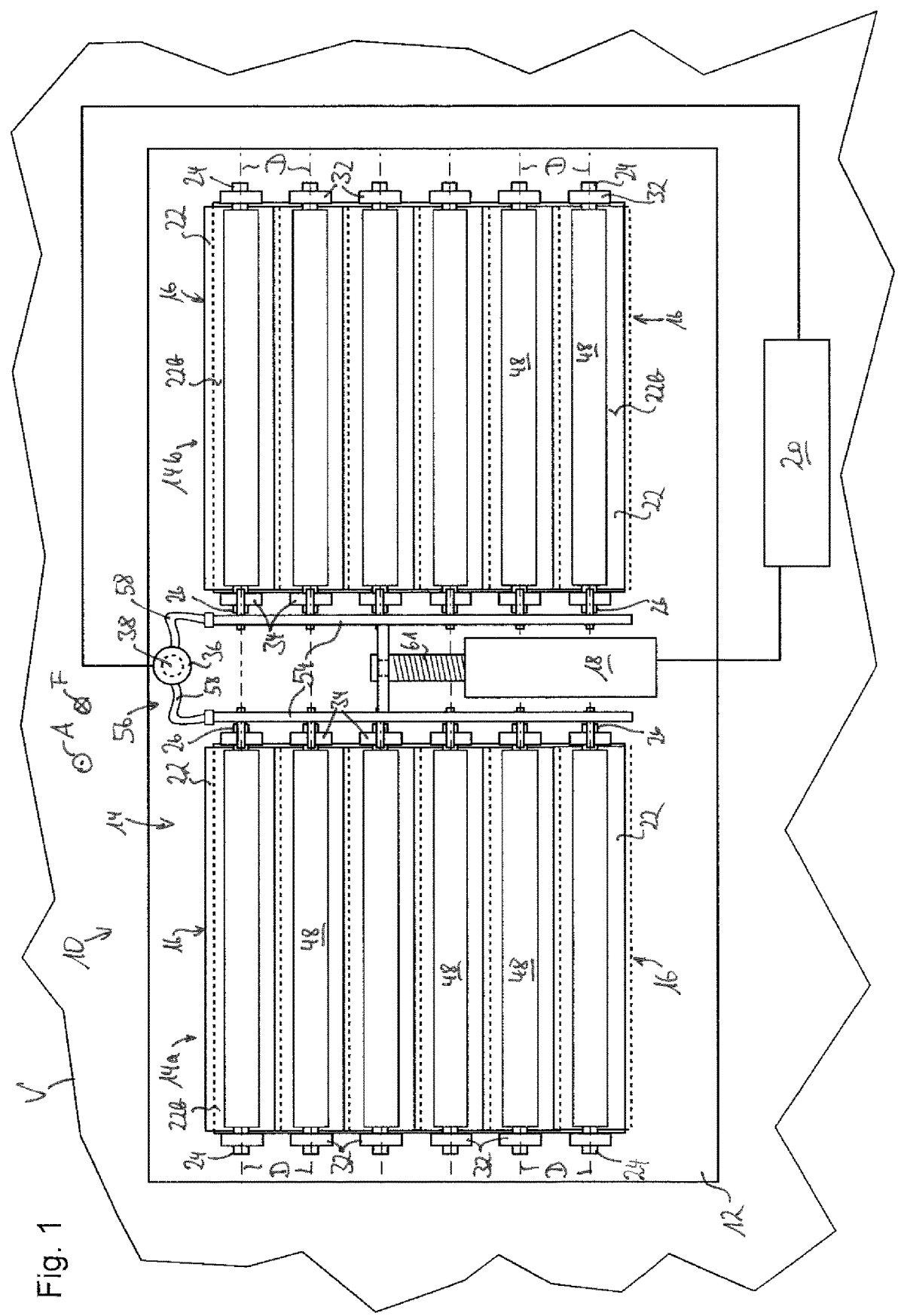
FIG. 1 is a schematic plan view of an embodiment according to the present invention of an air flap apparatus of the present Application, looking at the rear side which faces away from the flow-impingement side as intended, with the air flaps in the closed position.

Referring now to the drawings wherein the showings are for the purpose of illustrating preferred and alternative embodiments of the invention only and not for the purpose of limiting the same, it is expressly noted that the Figures for the present Application are not accurately to scale, nor do they accurately illustrate a relative motion of air flaps relative to the frame. The Figures serve merely to illustrate the principle of the present invention and are correspondingly schematic in nature.

Figure 2:
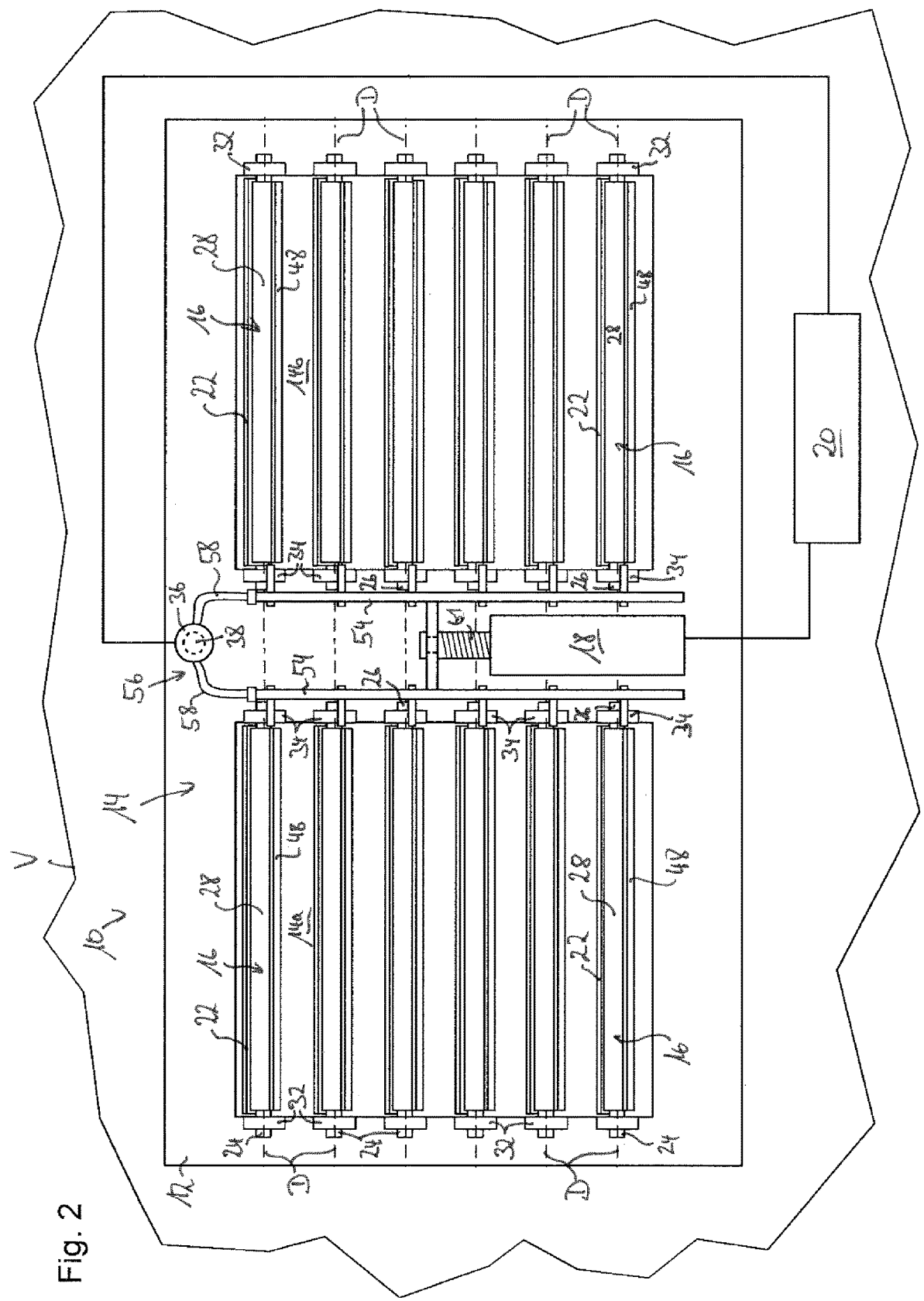
FIG. 2 is the view of FIG. 1 with the air flaps in the open position.

In FIGS. 1 and 2 an embodiment according to the present invention of an air flap apparatus for a motor vehicle V is labeled in general with the number 10. Air flap apparatus 10 encompasses a frame 12 that is embodied to be secured on motor vehicle V. Frame 12 comprises a flowthrough opening 14 constituted from two partial flowthrough openings 14a and 14b. When considered in a direction that is orthogonal to the drawing plane of FIGS. 1 and 2 and passes through the respective partial flowthrough openings 14a and 14b, a plurality of substantially identical air flaps 16 are mounted on frame 12 rotatably around rotation axes D. In the interest of clarity, only a few air flaps 16 and rotation axes D are labeled with reference characters. It is nevertheless clear that all the air flaps of the present Application are embodied as identical air flaps 16. Air flaps 16 that pass through partial flowthrough opening 14b on the right in FIGS. 1 and 2 are arranged in mirror-image fashion with respect to air flaps 16 that pass through partial flowthrough opening 14a on the left in FIGS. 1 and 2. Given the symmetry condition that exists, it is therefore sufficient to describe in further detail only one of air flaps 16, the description thereof likewise applying, under the aforesaid symmetry condition, to all remaining air flaps 16 of air flap apparatus 10.

Air flap apparatus 10 further encompasses a motion drive system 18 in the exemplifying form of a spindle drive whose motion can be controlled by a control apparatus 20 of air flap apparatus 10. Instead of the spindle drive, any other suitable motion drive system can be provided.

An air flap 16 comprises an air flap blade 22 that is arranged eccentrically with respect to the respective rotation axis D. Rotation axis D of an air flap 16 is defined by bearing studs 24 and 26 that project, coaxially away from the longitudinal center of air flap blade 22, from a box-shaped (in the example, parallelepipedal) surround 28. The air flap blade and surround 28 connected in one piece therewith constitute a flap body 30 of air flap 16.

Surround 28 in turn protrudes from rear side 22b of air flap blade 22, which is not impinged upon by flow during operation.

Figure 3:
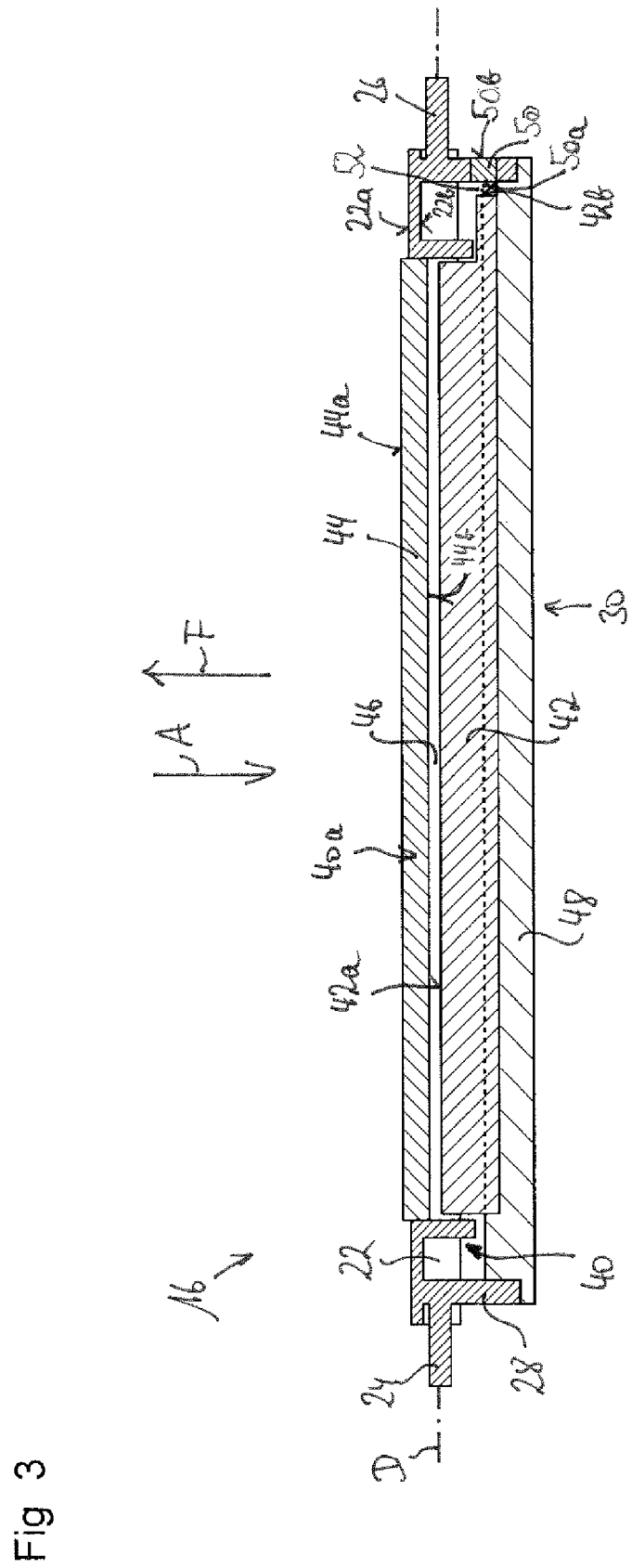
FIG. 3 is a schematic longitudinal section view of a light-emitting air flap of the air flap apparatus of FIGS. 1 and 2.

Bearing studs 26 are readily apparent only in FIGS. 2 and 3.

Bearing studs 24 and 26 of an air flap 16 pass through associated bearing brackets 32 and 34 that are provided in frame-fixed fashion on frame 12 for movable mounting of air flaps 16. Air flap 16 is thus unequivocally defined in terms of its location relative to the frame, its rotation axis D in particular being determined unequivocally by bearing studs 24 and 26 and unequivocally by bearing brackets 32 and 34, around which air flap 16 is displaceable between its closed position shown in FIG. 1 and its open position shown in FIG. 2. In the present example the rotation axes of air flaps 16 are located, in the operational flow impingement direction A of the air flap apparatus, behind the portion in frame 12 which defines flowthrough opening 14. Flow impingement direction A is parallel to forward travel direction F of vehicle V but directed oppositely. In the exemplifying embodiment depicted, flow impingement direction A is orthogonal to the drawing plane of FIGS. 1 and 2 and directed toward the observer; forward travel direction F of vehicle V is correspondingly directed away from the observer.

A light source 38 in the form of an LED arrangement is received on frame 12 in a receiving chamber 36. Light source 38 supplies light to light guides that will be described in further detail below.

As depicted in FIG. 3, air flap 16 comprises a recess 40 that passes completely through air flap blade 22 and surround 28. Recess 40 is delimited therein laterally, i.e. orthogonally to the direction in which air flap 16 passes through, by surround 28 that proceeds continuously around recess 40. Arranged in recess 40, as depicted in FIG. 3, is a chamber light guide 42 whose intended light exit surface 42a faces toward the external environment of air flap 16, specifically through an emission opening 40a, located on flow impingement side 22a of air flap 16, of recess 40 toward the front side of air flap apparatus 10 and of vehicle V that carries it.

In order to achieve particular comprehensive scattering of the light emerging from light exit surface 42a of chamber light guide 42, an optical diffusor apparatus 44 (hereinafter also referred to as a "diffusor"), which has a light-scattering surface topology on its light output surface 44a, is provided in emission opening 40a of recess 40.

Light exit surface 42a of flap light guide 42 is located with a gap 46 oppositely from a light input surface 44b of diffusor 44.

Surround 28 is closed off in fluid-tight fashion on the rear side of air flap 16 by a cover 48. Diffusor apparatus 44 likewise closes off surround 28 in fluid-tight fashion on the front side of the air flap. Cover 48 is also part of flap body 30.

Surround 28, like air flap blade 22, is manufactured from light-tight or at least opaque material, preferably by injection-molding of a thermoplastic material.

Surround 28 prevents any light scattered in recess 40 from being visible from outside vehicle V through flowthrough opening 14 when air flap apparatus 10 is open.

Flap light guide 42 comprises a light entrance surface 42b that is located with a gap 52 oppositely from a light outcoupling surface 50a of an incoupling light guide 50.

Incoupling light guide 50 is a constituent of surround 28 and is arranged in fluid-tight fashion therein. Incoupling light guide 50 is manufactured together with flap body 30 in a shared injection-molding tool, using the multi-component injection-molding method. Fluid-tight positionally accurate seating of incoupling light guide 50 in surround 28 and in flap body 30 can thereby be produced reproducibly with high quality.

Cover 48 and flap light guide 42 are likewise manufactured in a shared injection-molding tool using the multi-component injection-molding method. Cover 48 surrounds a portion of flap light guide 42 on four sides, so that flap light guide 42 is anchored fixedly and securely in cover 48.

With the arrangement of cover 48 in recess 40, flap light guide 42 consequently also becomes arranged in recess 40, specifically, because of the integral manufacture of cover 48 and flap light guide 42 on the one hand and of flap body 30, incoupling light guide 50, and diffusor 44 on the other hand, with respectively exact gap dimensions for gaps 52 and 46 and with perfect fluid-tight sealing with respect to the outside environment.

Diffusor 44 and flap body 30 are also manufactured integrally with one another using the multi-component injection-molding method. Flap body 30 surrounds the diffusor on four sides.

A distribution light guide 54 constituted from light-guide material is located oppositely from a light incoupling surface 50b, opposite from light outcoupling surface 50a, of incoupling light guide 50. Distribution light guide 54 is thus part of a frame light guide 56 retained in movably guided fashion on frame 14. This need not be the case: distribution light guide 54 can also be arranged in frame-mounted fashion. It can then, however, only transfer light to air flaps 16 when they are in a specific operating position, for example in their closed position or their open position.

The two distribution light guides 54 shown in FIGS. 1 and 2 are connected to light source 38 via flexible light guides 58 that can be constituted from bendable glass fiber bundles. Each of the two distribution light guides 54 comprises at its one longitudinal end an infeed portion at which light transfer from flexible light guides 58 to distribution light guides 54 occurs. Distribution light guides 54 and flexible light guides 58 together constitute frame light guide 56.

Distribution light guides 54 are movable together with air flaps 16 in such a way that their respective coupling longitudinal ends, facing toward air flaps 16, are located oppositely from light incoupling surface 50b of incoupling light guide 50 in any operating position of air flaps 16, so that they can emit light from light source 38, regardless of the operating position of the air flaps, via incoupling light guide 50, flap light guide 42, and diffusor 44 toward the front of vehicle V.

As a result of the integral manufacture, using the multi-component injection molding method, of cover 48 and flap light guide 42 on the one hand and of flap body 30, diffusor 44, and incoupling light guide 50 on the other hand, upon installation the aforesaid components not only are arranged relative to one another with the requisite accuracy in terms of dimensions and orientations, but furthermore recess 40 that receives the light guidance components 42, 44, and 50 is hermetically closed off, so that dirt cannot penetrate into that recess 40 during the operation of vehicle V.

Distribution light guides 54 are coupled (not depicted) to drive spindle 61 of motion drive system 18. In the present example, distribution light guides 54 also serve to transfer motion to air flaps 16. This need not be the case, however. Distribution light guides 54 can also be provided separately from any motion coupling of motion drive system 18 and air flaps 16, and can transfer only light.

Control apparatus 20 operates both motion drive system 18 and light source 38, so that the light emission of air flap apparatus 10 through optical diffusion apparatuses 44 can be controlled as a function of the operation of motion drive system 18, but does not need to be controlled as a function of the operation thereof.

Light source 38 can be variable in terms of color and/or variable in terms of brightness, i.e. dimmable.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An air flap apparatus for a motor vehicle, encompassing a frame having a flowthrough opening, on which frame at least one air flap is mounted movably relative to the frame so as to project into or pass through the flowthrough opening; the at least one air flap being displaceable between a closed position and an open position in order to modify a gas quantity flowing per unit time, with a predefined flow impingement, through the flowthrough opening; the at least one air flap decreasing a flowthrough-capable cross section of the flowthrough opening more greatly in the closed position than in the open position; the air flap apparatus further encompassing a motion drive system that is motion- and force-transferringly coupled to the at least one air flap in order to drive the at least one air flap to move between the closed position and the open position, wherein the at least one air flap of the air flap apparatus includes at least one light-emitting air flap, the at least one light-emitting air flap comprises at least one light exit surface that is embodied to radiate light to an external environment of the at least one light-emitting air flap, the at least one light-emitting air flap further comprising at least one light-guiding light guidance component that is embodied to guide light from a light entrance portion through to a light exit portion arranged at a distance therefrom, the at least one light guidance component being embodied integrally with a structural component, of the at least one light-emitting air flap.

2. The air flap apparatus according to claim 1, wherein one component from among the structural component and the at least one light guidance component is molded by injection molding onto the respective other component.

3. The air flap apparatus according to claim 1, wherein a portion of the at least one light guidance component is overmolded by the structural component.

4. The air flap apparatus according to claim 1, wherein the structural component and the light at least one guidance component are manufactured using a multi-component injection molding method.

5. The air flap apparatus according to claim 1, wherein the at least one light guidance component comprises a flap light guide having a light entrance surface and a light exit surface; and the structural component is a portion of a flap body, arranged in the flowthrough opening, of the at least one light-emitting air flap, the flap light guide extending over at least half of the length of the flap body.

6. The air flap apparatus according to claim 1, wherein the at least one light guidance component comprises a flap light guide having a light entrance surface and a light exit surface; and the structural component is a portion of a flap body, arranged in the flowthrough opening, of the at least one light-emitting air flap, the flap light guide extending over at least two thirds of the length of the flap body.

7. The air flap apparatus according to claim 5, wherein the flap body comprises a receiving recess for receiving the flap light guide therein, the structural component constituted integrally with the flap light guide being a cover that covers the receiving recess.

8. The air flap apparatus according to claim 5, wherein the at least one light-emitting air flap comprises, on its front side that is impinged upon by flow during operation, an emission opening through which light can be emitted from the flap light guide to the external environment of the at least one light-emitting flap.

9. The air flap apparatus according to claim 8, wherein the at least one light guidance component comprises an optical diffusor apparatus that is arranged in the emission opening and has a light input surface and a light output surface; and the structural component is a portion of the flap body, arranged in the flowthrough opening, of the at least one light-emitting air flap, the light input surface of the optical diffusor apparatus being arranged oppositely and at a distance from the light exit surface of the flap light guide.

10. The air flap apparatus according to claim 9, wherein the optical diffusor apparatus extends over at least half of the length of the flap body.

11. The air flap apparatus according to claim 9, wherein the optical diffusor apparatus extends over at least three quarters of the length of the flap body.

12. The air flap apparatus according to claim 9, wherein the length of the diffusor apparatus is equal to between 80% and 120% of the length of the light exit surface of the flap light guide.

13. The air flap apparatus according to claim 8, wherein the flap body comprises a receiving recess for receiving the flap light guide therein, the structural component constituted integrally with the flap light guide being a cover that covers the receiving recess; wherein the emission opening is an opening of the receiving recess in the flap body.

14. The air flap apparatus according to claim 5, wherein the at least one light guidance component comprises an incoupling light guide having a light incoupling surface and a light outcoupling surface; and the structural component is a portion of the flap body, arranged in the flowthrough opening, of the at least one light-emitting air flap, the light outcoupling surface of the incoupling light guide being arranged oppositely and at a distance from the light entrance surface of the flap light guide.

15. The air flap apparatus according to claim 14, wherein the at least one light guidance component comprises a flap light guide having a light entrance surface and a light exit surface; and the structural component is a portion of a flap body, arranged in the flowthrough opening, of the at least one light-emitting air flap, the flap light guide extending over at least half of the length of the flap body; wherein the at least one light-emitting air flap comprises, on its front side that is impinged upon by flow during operation, an emission opening through which light can be emitted from the flap light guide to the external environment of the at least one light-emitting flap; wherein the at least one light guidance component comprises an optical diffusor apparatus that is arranged in the emission opening and has a light input surface and a light output surface; and the structural component is a portion of the flap body, arranged in the flowthrough opening, of the at least one light-emitting air flap, the light input surface of the optical diffusor apparatus being arranged oppositely and at a distance from the light exit surface of the flap light guide; wherein the structural component that carries the incoupling light guide and constitutes a one-piece structural component is also the structural component that carries the optical diffusor apparatus.

16. The air flap apparatus according to claim 1, wherein the at least one light-emitting air flap is a plurality of light-emitting air flaps that are arranged on the frame successively along a succession axis.

17. The air flap apparatus according to claim 16, further comprising a plurality of flow-directing surfaces that are mounted on the frame immovably relative thereto and project into or pass through the flowthrough opening.

18. The air flap apparatus according to claim 1, wherein a frame light guide, which is light-transferringly coupled to at least one of the at least one light guidance component of the at least one light-emitting air flap, is retained on the frame.

19. The air flap apparatus according to claim 18, further comprising a light source which is light-transferringly connected to the frame light guide in such a way that light emitted from the light source is transferrable by the frame light guide.

20. A motor vehicle having an air flap apparatus according to claim 1, such that a front side of the at least one light-emitting air flap, which is impinged upon in the closed position by wind blast when the motor vehicle is traveling forward, faces in a forward travel position in the closed position.

* * * * *